J. F. LYNCH.
AUTOMOBILE DIRECTION SIGNAL.
APPLICATION FILED DEC. 4, 1919.
1,357,504.
Patented Nov. 2, 1920.
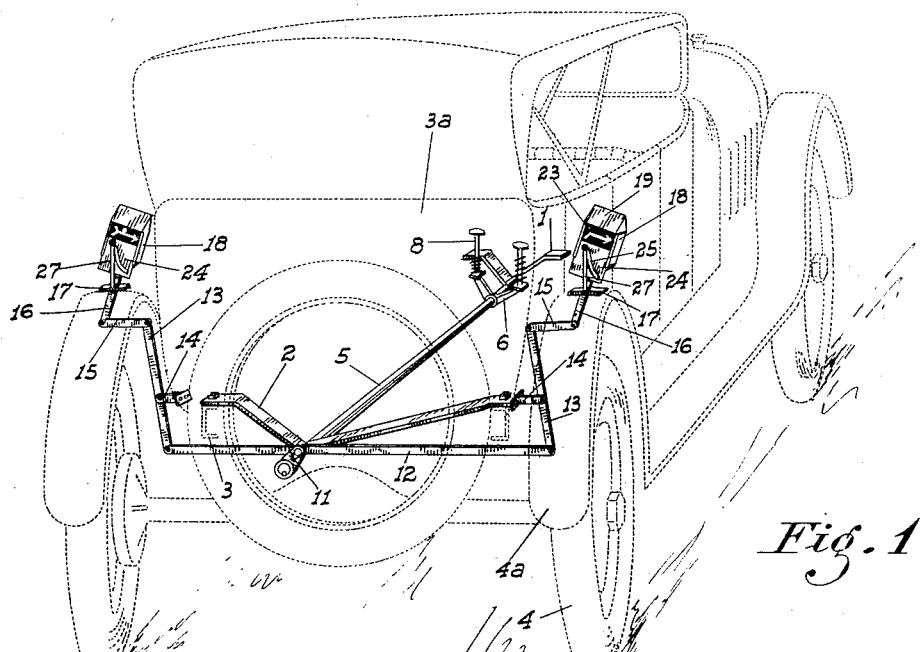
*Fig. 1*
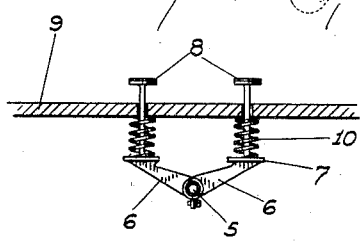
*Fig. 2*
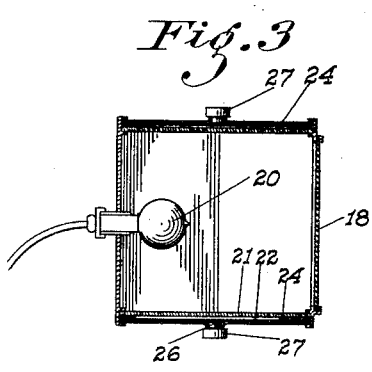   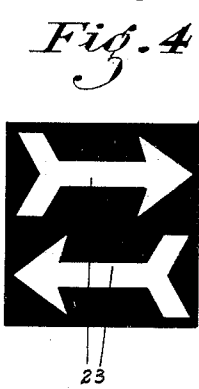   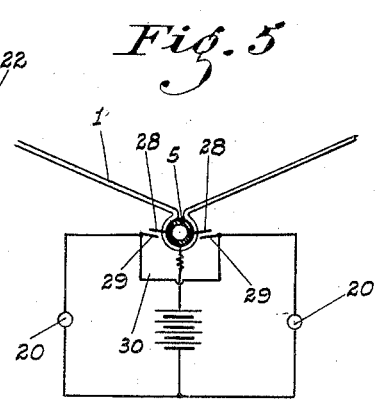
*Fig. 3*   *Fig. 4*   *Fig. 5*
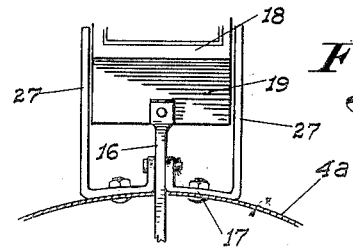
*Fig. 6*
INVENTOR.
Joseph F. Lynch
BY
ATTORNEY

UNITED STATES PATENT OFFICE.

JOSEPH F. LYNCH, OF STOCKTON, CALIFORNIA.

AUTOMOBILE DIRECTION-SIGNAL.

1,357,504.   Specification of Letters Patent.   Patented Nov. 2, 1920.

Application filed December 4, 1919. Serial No. 342,323.

*To all whom it may concern:*

Be it known that I, JOSEPH F. LYNCH, a citizen of the United States, residing at Stockton, in the county of San Joaquin, State of California, have invented certain new and useful Improvements in Automobile Direction-Signals; and I do declare the following to be a full, clear, and exact description of the same, reference being had to the accompanying drawings, and to the characters of reference marked thereon, which form a part of this application.

This invention relates to improvements in direction signals for automobiles, the principal object being to produce a device, operable at will by the driver of the vehicle, by means of which the driver of a following car will be notified and warned in advance as to the direction of turning about to be taken by the car ahead.

Another object is to so arrange and construct the device that its operation may be seen either by night or day, from the front or rear of the car, and which does away with the necessity of the driver placing his hand or arm outside of the car to indicate his intention to turn.

A third object is to produce a device which besides indicating the direction to be turned, will catch the eye of the driver of a following car and will forcibly arrest his attention.

The foregoing and other objects I accomplish by means of such structure and relative arrangement of parts as will fully appear by a perusal of the following specification and claims.

In the drawings similar characters of reference indicate corresponding parts in the several views.

Figure 1 is a perspective outline of an automobile showing my improved signal means installed thereon.

Fig 2 is a fragmentary view showing the operating pedals.

Fig. 3 is a top section of one of the lamps.

Fig. 4 is a side elevation of a plate showing direction arrows cut therein.

Fig. 5 is a diagrammatic view of the lamp actuating circuit.

Fig. 6 is a fragmentary side view showing a lamp standard.

Referring now more particularly to the characters on the drawings, the numerals 1 and 2 denote a pair of transverse brackets or supports mounted to the frame 3 of the car, the bracket 1 being adjacent the dash board and the bracket 2 preferably just forward of the center line of the rear wheels 4. Turnably mounted in these brackets is a longitudinal shaft 5 secured to which adjacent the bracket 1 are a pair of opposed arms 6 extending on an upward slant at right angles to the shaft. The upper end of each arm has a pad 7 thereon, against which bears the lower end of a pedal 8 projecting through the floor 9 of the car, within easy reach of the feet of the driver, there being a spring 10 between the floor and the pad.

To the rear end of the shaft 5 is fastened an upstanding arm 11 in which is flexibly secured a transverse bar 12 projecting both ways from the arm and pivoted at its outer ends to the lower ends of vertical lever arms 13 pivotally mounted to brackets 14 projecting from and secured to the body $3^a$ of the car.

To the upper ends of these arms are pivoted horizontal and transverse links 15 which are also connected to vertical light supporting standards 16 pivotally mounted for transverse movement in bases 17 secured to the rear fenders $4^a$ of the car.

The lamps 18 are of special construction, and are preferably rectangular in shape, having their upper and lower faces peaked in opposite directions as at 19 in order to give reflective power to the electric light 20 in the lamp.

The front and rear sides are provided with glass panes 21, preferably colored red, outside of which are opaque plates 22, in each of which are cut a pair of horizontal arrows 23 pointing in opposite directions.

Outside of these plates, and slidably mounted in the lamp for vertical movement relative thereto are opaque plates or shutters 24 each provided with a substantially vertical reverse-curve slot 25 adapted to receive a roller 26 therein mounted on the upper end of a rigid arm 27 fixed to or formed with the base 17.

In order to cause the lamps 20 to glow only when either of the pedals 8 is depressed, the shaft 5 adjacent either of the supporting brackets is provided with a pair of opposed contact points 28 adapted to bear against either one at a time of their corresponding contacts 29 in the circuit 30 connected to both the lamps 20 in common, so that a movement of said shaft in either direction will cause both lamps to be lighted and they will remain lighted until the shaft resumes its normal position, when the circuit will be broken.

To illustrate the operation of the device, I have shown the parts in Fig. 1 moved or actuated to indicate an intention to make a turn to the right.

In this case therefore the right hand one of the pedals 8 is depressed, which turns the shaft and the arm 11 thereon to the right, at the same time closing the circuit through both lamps 20. The movement of the arm 11, through the medium of the arms and links connected therewith causes both light standards 16 and the lamps fixed thereto to also move to the right, the proportions of the co-acting parts being such that a movement of two or three inches is had by the lamps to either side of the perpendicular.

This sidewise movement of the lamps causes the slides or shutters 24 to be lowered, since the roller retaining arms 27 are stationary. This uncovers the upper half of the plates 22, thus displaying the upper ones of the arrows 23, with both to the right.

Since these arrows are cut or stenciled out of the plates, the rays from the lights 20 are seen through the colored glasses 21, thus sharply throwing the arrows into prominence.

With a pressure on the left hand pedal, the reverse conditions obtain, and the lower arrows are uncovered, which point to the left.

As soon as the pressure is removed from the pedals, the springs 10 bring the members back to normal or neutral, and also break the electrical circuit through the lights.

If preferred, the pedals 10, or some similar means of controlling the movement of the shaft 5, may be extended upwardly to be worked by the hands instead of the feet.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:—

1. A direction signal for automobiles comprising lamps pivotally mounted on both sides of the vehicle for transverse swinging movement, means actuated by the driver for simultaneously swinging the lamps in either direction, and means governed by such movement for uncovering direction indicators illumined by the lamps, said indicators pointing in the direction toward which the lamps are swung.

2. A direction signal for automobiles comprising lamps pivotally mounted on both sides of the vehicle for transverse swinging movement, and adapted to be simultaneously swung to either side at the will of the driver, plates in both ends of the lamps each having a pair of opposed arrows cut transversely therein to enable the rays of the lamps to shine therethrough but normally concealed from view, and means for uncovering one of each of said arrows when the lamps are moved in the corresponding direction.

3. A direction signal for automobiles comprising lamps pivotally mounted on both sides of the vehicles for transverse swinging movement, and adapted to be simultaneously swung to either side at the will of the driver, plates in both ends of the lamps each having a pair of opposed arrows cut transversely therein to enable the rays of the lamps to shine therethrough but normally concealed from view, and means governed by the swinging of the lamps to either side for uncovering the arrows pointing in the same direction as that in which the lamps are swung.

4. A direction signal for automobiles comprising lamps pivotally mounted on both sides of the vehicle for transverse swinging movement, and adapted to be simultaneously swung to either side at the will of the driver, plates in both ends of the lamps each having a pair of opposed arrows cut transversely therein to enable the rays of the lamps to shine therethrough, an opaque shutter normally covering each plate, and means actuated by the movement of the lamps in either direction for uncovering the arrows pointing in the corresponding direction.

In testimony whereof I affix my signature.

JOSEPH F. LYNCH.